Patented May 28, 1946

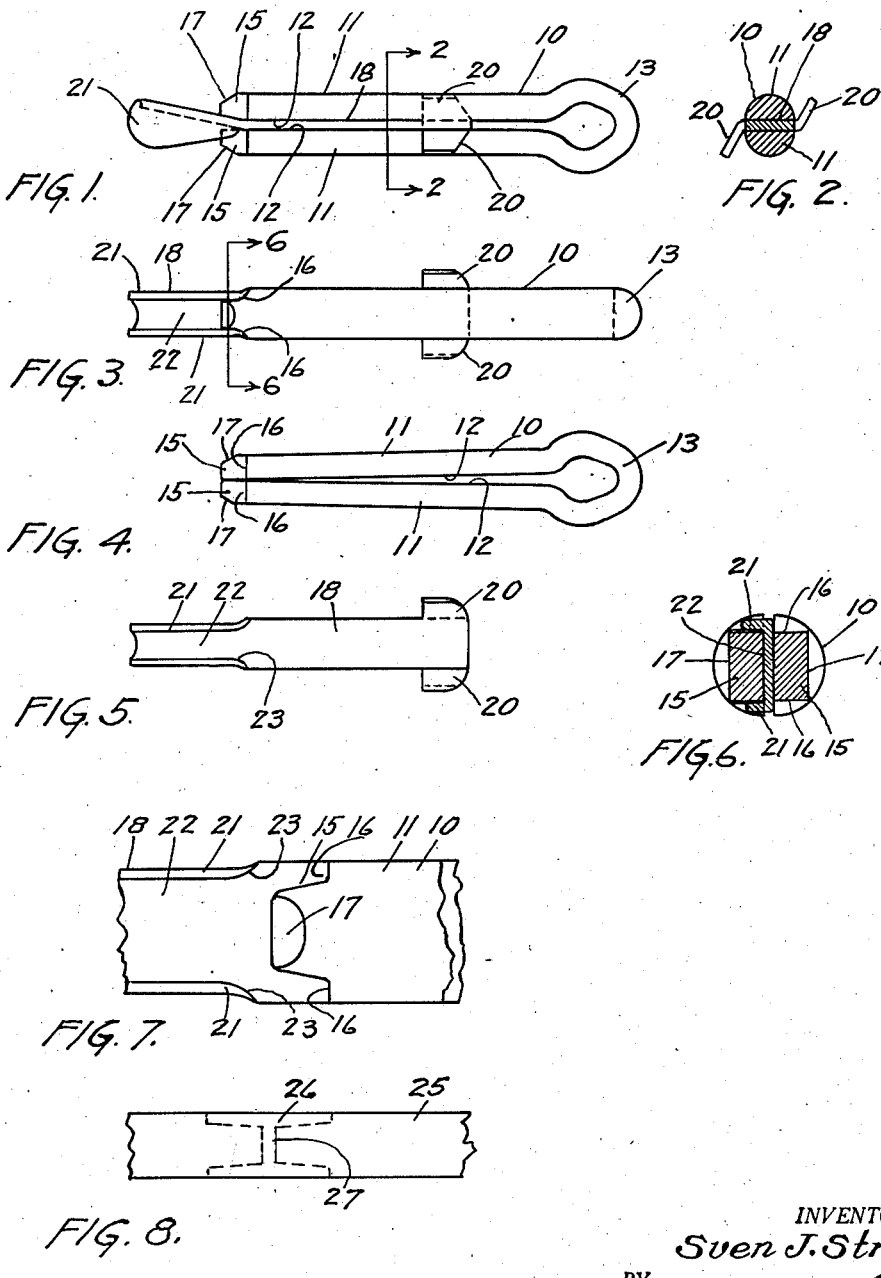

2,400,960

UNITED STATES PATENT OFFICE 2,400,960

COTTER PIN CONSTRUCTION

Sven J. Strid, Chicago, Ill., assignor to T & S Corporation, Chicago, Ill., a corporation of Illinois Application March 22, 1945, Serial No. 584,206

6 Claims. (Cl. 85—8.5)

My invention relates to fastening devices with special reference to cotter pin assemblies constructed for self-spreading action and is directed to the problem of maintaining the cooperating parts of such an assembly in proper relative positions during handling and shipment.

In a cotter pin of the present type such as disclosed, for example, in my Patent No. 2,166,614, or in my co-pending application, Serial No. 528,693, the cotter pin assembly comprises a cotter pin member or cotter pin proper having the usual two arms in combination with a spreader member extending between the two arms. During shipment and handling of the assembly prior to use, the cotter pin and the wedge member are in retracted positions relative to each other. When the cotter pin is ultimately driven into place for service as a fastening device, the spreader member remains stationary so that the relative longitudinal movement of the cotter pin causes the arms of the cotter pin to be spread apart at their ends.

The general problem with which the present invention is concerned is to provide such engagement between the spreader member and the cotter pin while in their retracted positions as will serve to hold the assembly together in proper alignment notwithstanding handling and rough usage prior to the placing of the assembly in service. Among the specific objects of my invention relating to this problem are: to provide exceptionally strong interengaging elements with consequent higher resistance to separation of the parts than heretofore achieved; to provide interengagement characterized by use of a relatively deep latching recess; to provide such a recess with relatively steep walls for cooperation with a complementary engaging element; and to provide a cotter pin assembly such that impact at either end of the assembly will tend to force the relatively movable parts into interengagement rather than tend to separate the parts.

Other objects of the invention are directed to ease of original assembly in preparation for shipment as well as any subsequent re-assembly that may be necessary. The parts are to be so constructed in the preferred practice of my invention that the assembly operation consists simply in moving the cooperating parts together to their limit positions, there being no necessity for terminating the movement at some intermediate normal position. In other words, it is contemplated that the worker in assembling the parts will merely move the parts together with a degree of excess force. One feature of my preferred construction in this regard is the concept of tapering cooperating parts for guidance in the course of such assembly movement.

A further object of my invention is to reduce the cost of cotter pin assemblies of the present type. One specific object in mind is to minimize the cost of manufacture by eliminating one step in the prior fabricating procedure. Another object bearing on expense is to provide a cotter pin in which salvaged spreaders or inserts of the forms heretofore constructed may be reused with the new cotter pin member.

The above and other objects and advantages of my invention will be apparent in the following description taken with the accompanying drawing.

In the drawing, which is to be regarded as merely illustrative:

Figure 1 is a side elevation of the preferred form of cotter pin assembly in the normal assembled state ready for installation, Figure 2 is a transverse section taken as indicated by the line 2—2 of Figure 1, Figure 3 is a plan view of the cotter pin assembly, Figure 4 is a side elevation of the separate cotter pin member, Figure 5 is a plan view of the separate spreader or insert, Figure 6 is a transverse section somewhat enlarged taken as indicated by the line 6—6 of Figure 3, Figure 7 is a fragmentary plan view on an enlarged scale showing certain cooperating parts in the course of the assembly movement, and Figure 8 is a fragmentary plan view of a portion of a metal strip from which the cotter pin member is fabricated.

The cotter pin member, generally designated 10 in the drawing, comprises two arms 11 having flat inner faces 12, the arms being sprung toward each other. Such a cotter pin member may be of the usual general structure in which the two arms 11 are interconnected by the usual loop 13, the cotter pin member being formed from a single piece of suitable half-round stock.

At least one of the arm 11 is cut away at its end to provide a reduced end portion and at least one lateral shoulder. In the present construction, both of the arms 11 are cut away at their ends and two such lateral shoulders are formed on each of the arm ends. Thus, as best shown in Figure 3, each of the arms 11 has a reduced end or nose 15 flanked by two lateral shoulders

16. Preferably, each nose 15 is of slightly tapered configuration in plan.

For the purpose of facilitating the entrance of the cotter pin member into bore holes for the usual cotter pin service, the end of the cotter pin is preferably of tapered configuration. The drawing shows the reduced end or nose 15 of each arm 11 formed with a bevel 17.

The spreader member, generally designated 18, is, in the preferred form of my invention, a stamping fabricated from flat stock. The particular spreader member 18 shown in the drawing is of a well-known construction having laterally extending portions or wings 20 near one end for limiting the movement of the spreader member through a bore when the assembly is installed for the usual cotter pin service. The two wings 20 are bent for engagement with the cotter pin member 10 to prevent local lateral movement between the spreader member and the cotter pin member. As indicated in Figure 2, preferably, these wings 20 are bent in opposite directions.

At its other end, the spreader member 18 has a wedge portion comprising a pair of upturned flanges 21 of tapering configuration. Preferably, the flanges are substantially parallel in accord with the usual practice so that the channel 22 formed by the two flanges has relatively steep sides. It will be noted that the punch press operation for producing the two flanges 21 makes the entrance to the channel 22 slightly flaring, as indicated at 23.

When the cotter pin member 10 with the arms sprung together, as shown in Figure 4, is moved longitudinally into embracing engagement with the spreader member 18, the reduced end or nose 15 on one of the two arms 11 approaches the channel 22 in the manner indicated by Figure 7. It will be noted in Figure 7 that both the tapered configuration of the nose 15 and the flared entrance 23 serve to guide the nose into the channel 22. During this assembly movement, there is a moderate and substantially uniform frictional resistance caused by the pressure of the two arms 11 on the opposite faces of the spreader member 18. As soon as the nose 15 enters the channel 22 sufficiently to bring the two lateral shoulders 16 into contact with the flanges 21, the resistance to the relative movement of the parts abruptly increases. In practice, the operator moves the two parts together with only moderate force and the abrupt rise in resistance serves to stop the relative movement in a positive manner leaving the parts in the desired assembled relationship shown in Figures 1 and 3 for handling and shipment.

It is apparent that the normal assembled relationship restricts relative lateral movement between the cotter pin member 10 and the spreader member 18 at two spaced longitudinal points of the assembly and thereby completely immobilizes the two parts relative to each other. The first of these longitudinal points of limiting action is at the region where the two wings 20 engage the opposite sides of the cotter pin member 10. The second of the two points is at the end of the cotter pin member 10 where the nose 15 extends into the channel 22 and is abutted on its opposite sides by the two flanges 21.

The normal gripping of the spreader member 18 by the cotter pin member 10 is sufficient to prevent longitudinal retraction of the parts since even the roughest handling seldom involves any force tending to pull the two members apart longitudinally. Handling and shipping do involve impact against the two ends of the assembly, i. e., against the loop 13 or against the outer ends of the wedging flanges 21, but such impact is in the direction of the entrance of the nose 15 into the channel 22 and, therefore, has no undesirable effect with respect to interengagement of the two members.

An important feature of my invention is that the new construction with the outstanding advantages made apparent above may be fabricated in an easier and less expensive manner than prior art devices. Heretofore it has been usually necessary to perform a special operation on the spreader member to adapt the spreader member for engagement with the cotter pin member at the second point longitudinally of the assembly. In my two previous disclosures mentioned above, for example, special forming operations are required.

The provision of the reduced ends 15 is all that is necessary to provide for the interengagement of the parts at the second point longitudinally of the assembly. In the practice of the present invention, the usual manufacturing procedure may be modified to form these two reduced ends 15 without additional labor. The first operation in fabricating the cotter pin member 10 is to cut the strip material to length. Figure 8 shows a portion of a straight piece 25 of half-round stock and shows in dotted lines how a punch press can be employed to sever the stock to form in one operation two of the reduced ends 15. The severing dies cut away two marginal portions 26 along the opposite sides of the stock and an interconnecting portion 27 thereby forming in the one operation two reduced ends or noses 15 with two pairs of the lateral shoulders 16.

Various changes and substitutions may be made in the light of my basic concept within the scope of my appended claims.

I claim:

1. In a cotter pin assembly, a pin having two arms sprung toward each other, at least one of said arms having a nose of reduced width on its end, and a spreader between said arms having two shoulders extending laterally outward in engagement with opposite sides of said pin to limit lateral movement between the spreader and the pin at one longitudinal point of the assembly, said spreader having a wedge portion for wedging action between the ends of said arms to spread the arms when the assembly is applied to use, said wedge portion being formed with a longitudinal channel to engage said nose from opposite sides prior to such use thereby to limit lateral movement between the spreader and the pin at a second longitudinal point of the assembly.

2. In a cotter pin assembly, a pin having two arms sprung toward each other, one of said arms having an end portion of reduced width with a portion of substantially full width adjacent thereto, the other of said arms having a corresponding substantially full width portion, and a spreader between said arms having two shoulders extending laterally outward in engagement with opposite sides of said pin to limit lateral movement between the spreader and the pin at one longitudinal point of the assembly, said spreader having a wedge portion for cooperation with said full width portions of the arms to spread the arms when the assembly is applied to use, said wedge portion being formed with a longitudinal channel to engage said end portion from opposite sides prior to such use thereby to limit lateral movement between the spreader and the pin at a second longitudinal point of the assembly, said channel having a flared entrance for said end portion to facilitate longitudinal movement of the end portion into engagement with the channel.

3. In a cotter pin assembly, a pin having two arms sprung toward each other, one of said arms having a nose of reduced width on its end, and a spreader between said arms having two shoulders extending laterally outward in engagement with opposite sides of said pin to limit lateral movement between the spreader and the pin at one longitudinal point of the assembly, said spreader having a wedge portion for wedging action between the ends of said arms to spread the arms when the assembly is applied to use, said wedge portion being formed with a longitudinal channel to engage said nose from opposite sides prior to such use thereby to limit lateral movement between the spreader and the pin at a second longitudinal point of the assembly, said nose being tapered to facilitate its entrance longitudinally into said channel.

4. In a cotter pin assembly, a pin having two arms sprung toward each other, said two arms having reduced ends and adjacent laterally extending portions, and a spreader between said arms having two shoulders extending laterally outward in engagement with opposite sides of said pin to limit lateral movement between the spreader and the pin at one longitudinal point of the assembly, said spreader having a wedge portion to cooperate with said laterally extending portions of the two arms to spread said arms when the assembly is applied to use, said wedge portion being formed with a longitudinal channel to engage one of said reduced ends from opposite sides prior to such use thereby to limit lateral movement between the spreader and the pin at a second longitudinal point of the assembly.

5. In a cotter pin assembly, a pin having two arms sprung toward each other at least one of said arms being reduced in width at one end to form a relatively narrow nose and at least one lateral shoulder, and a spreader between said arms having two shoulders extending laterally outward near one end in engagement with opposite sides of said pin to limit lateral movement between the spreader and the pin at one longitudinal point of the assembly, said spreader being formed with a wedge portion for engagement with said first-mentioned shoulder to spread said arms when the assembly is applied to use, said wedge portion having a recess to engage said nose from opposite sides prior to such use thereby to limit lateral movement between the spreader and the pin at a second longitudinal point of the assembly prior to such use.

6. In a cotter pin assembly, a pin having two arms sprung toward each other at least one of said arms being reduced in width at one end to form a nose flanked by two lateral shoulders, and a spreader between said arms having two shoulders extending laterally outward in engagement with the opposite sides of said end to limit lateral movement between the spreader and the pin at one longitudinal point of said assembly, said spreader being formed with a pair of spreader flanges to act on said first-mentioned two shoulders respectively when the assembly is applied to use, said spreader flanges being spaced apart to engage said nose from opposite sides thereby to limit lateral movement between the spreader and the pin at a second point longitudinally of said assembly.

SVEN J. STRID.